United States Patent [19]
Woolacott

[11] 4,387,026
[45] Jun. 7, 1983

[54] ION EXCHANGE REGENERATION PLANT

[75] Inventor: Charles F. Woolacott, Mississauga, Canada

[73] Assignee: Biolab Equipment Ltd., Montreal, Canada

[21] Appl. No.: 228,662

[22] Filed: Jan. 26, 1981

[51] Int. Cl.³ .................................................. B01J 49/00
[52] U.S. Cl. .................................... 210/669; 210/675; 210/677; 210/686; 210/687; 210/275; 521/26
[58] Field of Search .............................. 210/675–677, 210/686, 189, 269, 669, 670, 678, 687, 275; 521/26

[56] References Cited

U.S. PATENT DOCUMENTS

| | | |
|---|---|---|
| 2,248,055 | 7/1941 | Bird ........................................ 210/677 |
| 3,193,498 | 7/1965 | Platzer et al. ........................ 210/686 |
| 3,298,950 | 1/1967 | Mindler ................................. 210/676 |
| 3,429,807 | 2/1969 | Burgess ................................. 210/675 |
| 3,595,385 | 7/1971 | Duff ....................................... 210/686 |
| 3,634,229 | 1/1972 | Stanley .................................. 210/675 |
| 4,182,676 | 1/1980 | Casolo ................................... 210/669 |
| 4,219,413 | 8/1980 | Jackson et al. ...................... 210/670 |

Primary Examiner—Ivars C. Cintins
Attorney, Agent, or Firm—Sim & McBurney

[57] ABSTRACT

An automated plant for the regeneration of exhausted cation exchange material and exhausted anion exchange material involves the use of novel pretreatment and separation procedures, the use of novel regeneration processes, neutralization of waste chemicals and the use of novel cylinder recharging procedures. Electronic process controls are used to effect automatic operation.

20 Claims, 1 Drawing Figure

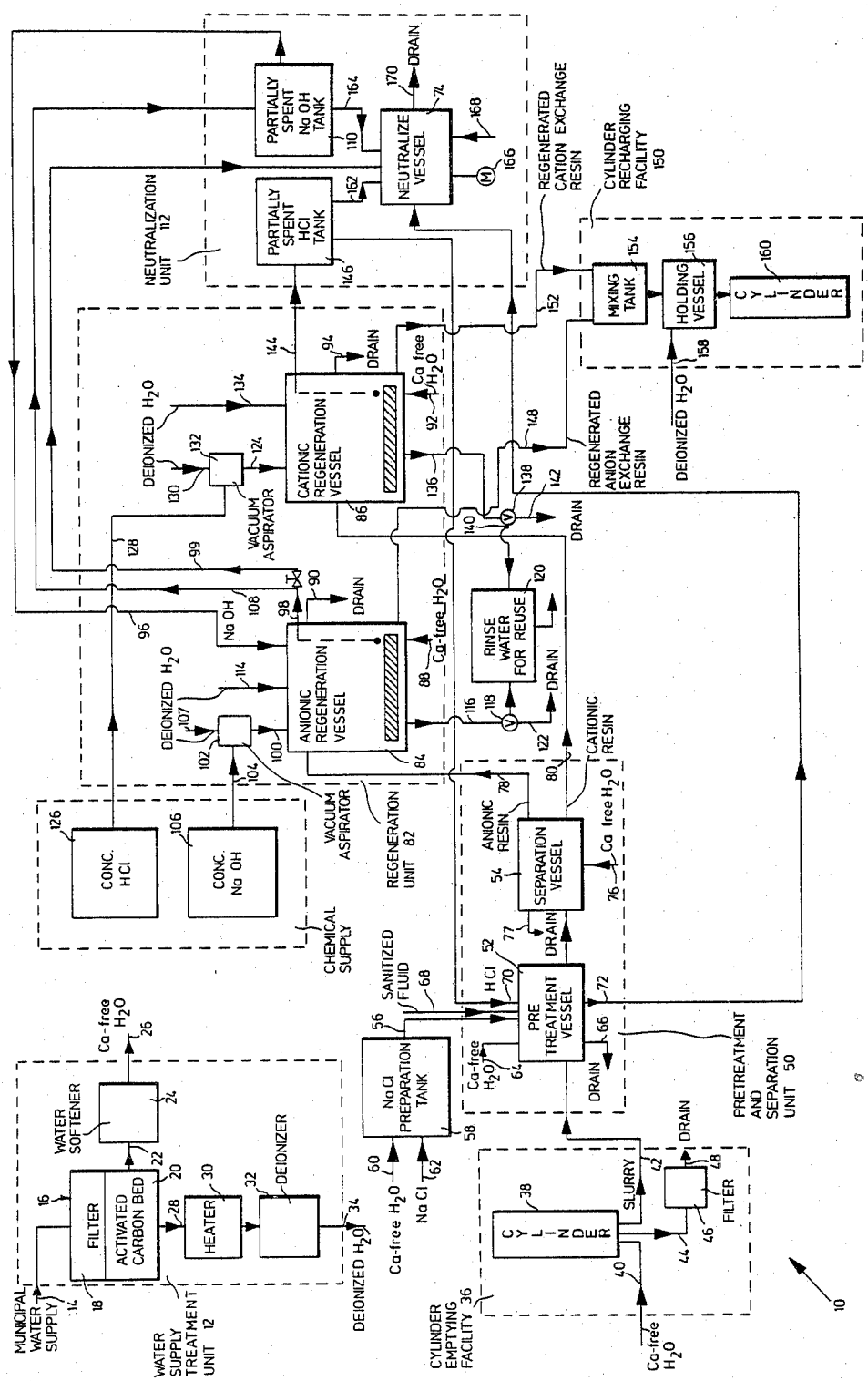

ION EXCHANGE REGENERATION PLANT

FIELD OF INVENTION

The present invention relates to the regeneration of ion-exchange resin.

BACKGROUND TO THE INVENTION

Demineralization of water is often carried out using service demineralizers which employ the principle of either mixed bed or separate bed demineralization. The water is rendered mineral free, selectively or entirely, by passing it through a bed or filter of completely mixed ion-exchange materials (mixed bed) or through separate beds of individual ion exchange materials (separate beds) contained in the service demineralizers.

The ion exchange resins are of two types, namely cation exchange resin in hydrogen ion form and anion exchange resin in hydroxyl ion form. The cation exchange resin removes cations, typically calcium, magnesium, sodium, potassium, iron and manganese from the water, while the anion exchange resin removes anions, typically carbonates, bicarbonates, sulfates, chlorides, nitrates and silica. An efficient mixed-bed ion exchanger is able to produce water of high purity by removal of the ionic species.

The ion exchange resins become exhausted in use but may be regenerated for reuse. In the case of the anion exchange resin, regeneration may be effected using sodium hydroxide solution, while hydrochloric acid may be used to regenerate the cation exchange resin. The service demineralizer often takes the form of a portable exchange cylinder which, when exhausted, is removed and replaced by a fresh cylinder. The exhausted cylinder is returned to a central regeneration plant. One such plant has been described in Canadian Pat. No. 856,301 and its equivalent U.S. Pat. No. 3,429,807. Exhausted ion exchange material from more than one service unit, which may be mixed bed or separate bed, is regenerated simultaneously in the plant.

In the latter procedure, following removal of impurities from the ion exchange material, anion exchange resin and cation exchange resin are placed in separate regeneration vessels. When mixed bed material is processed, the resins are hydraulically separated prior to transfer to their respective regeneration vessels. The resins are regenerated simultaneously by passing a caustic solution through the exhausted anion exchange resin and an acid solution through the exhausted cation exchange resin. Following regeneration, the ion exchange resins are rinsed with demineralized water. The regenerated resin then is transferred to the service unit, following hydraulic mixing of the resin types for a mixed bed unit.

This prior art procedure is labour intensive and prone to operator error. The procedure is also very inefficient with respect to energy utilization and water utilization. Nevertheless there are a large number of plants in the United States and Canada which utilize this prior art procedure for lack of a better procedure.

SUMMARY OF INVENTION

The present invention provides an improved exhausted ion-exchange material regeneration process and apparatus therefor. The process is automated to minimize labour requirements and to ensure close control of operations. The process makes effective use of energy and process water and avoids the discharge of harmful effluents.

The invention includes a plurality of interconnected operations and equipment. The elements of equipment include:
  (a) A water supply treatment unit to process municipal water supply into forms utilizable in the plant;
  (b) A cylinder emptying facility in which service cylinders containing exhausted resin are discharged;
  (c) A pretreatment and separation unit in which the exhausted resin is pretreated to ensure complete exhaustion of the resin, to destroy microorganisms and to remove calcium fouling chemicals and certain organic foulants, and thereafter is separated into anionic and cationic resin fractions. The separation is not required if the resin bed removed from the cylinder is of a single type;
  (d) A resin regeneration unit in which anionic and cationic resin is separately and simultaneously regenerated;
  (e) A cylinder recharging facility in which the regenerated resin is mixed and charged to cylinders, in the case of a mixed bed requirement, or in which the individual regenerated resins are separately charged to cylinders in the case of a single bed requirements; and
  (f) a neutralization unit to ensure that spent chemicals are neutralized prior to discharge to drain.

BRIEF DESCRIPTION OF DRAWING

The sole FIGURE of drawing is a schematic flow sheet illustrating the preferred embodiment of the invention.

DESCRIPTION OF PREFERRED EMBODIMENT

Referring to the drawing, an ion-exchange resin regeneration plant 10 includes a plurality of units which are interconnected to achieve automated regeneration of ion-exchange resin in efficient manner.

A water supply unit 12 provides water at the pressure, temperature and purity required for the various steps of the process. Municipal water supply is received by line 14 and passed through a purifier 16 comprising a filter 18 to remove particulates from the water and an activated carbon bed 20 to remove organic contaminants and chlorine from the water. The carbon bed may be backwashed frequently and be replaced at intervals to avoid exhaustion of the bed and to control bacterial growth.

Part of the purified water is passed by line 22 to a water softener 24 containing a bed of cation exchange resin in sodium form to soften the water by removing calcium contaminants, to result in calcium-free water in line 26 for use as described below. The use of softened water prevents fouling of anion resin with calcium. In this process, cold softened water is used in many instances in place of prior art heated decationized water, thereby achieving energy, regenerant chemical and water economies.

The remainder of the water is passed by line 28 through a heater 30 and a demineralization unit 32 to result in heated deionized water in line 34 for use as described below. The operations of demineralization and heating may be reversed, if desired, although it is preferred to heat first to facilitate more effective demineralization. The temperature of the water is typically controlled to about 30° C.

Pressure control regulation may be provided to ensure an adequate flow rate and/or pressure from the municipal water supply. A reservoir for filtered water may be provided to make up for any inadequacies of the water supply.

In an alternative water supply system, all the water from the purifier 16, following heating and blending to, typically, 30° C., is fed to a separate bed (cation-anion) self-regenerating deionizer. Following passage through the cation resin bed, the decationized water enters a vented holding reservoir through a top mounted spray nozzle, which allows gases, particularly carbon dioxide, to escape into the atmosphere as the water issues from the spray nozzle into the reservoir, thereby effectively acting as a degassifier.

Part of the decationized water may be used as described below for the softened water in line 26, while the remainder passes through the anion bed of the self-regenerating deionizer to form demineralized water, which is polished further in mixed bed portable exchange deionizers to provide deionized water of high resistivity (up to $18 \times 10^6$ ohms/cm$^3$), for use as described below with respect to the deionized water in line 34.

The plant 10 also includes a cylinder emptying facility 36. Portable exchange deionizers or service cylinders 38, containing exhausted resin, and of any convenient size or configuration as used in the water purification industry, are placed in an inverted position and the exhausted resin is displaced by calcium-free water fed by line 40 (from line 26) to form a slurry of the resin in line 42.

The plant 10 is described with particular reference to the regeneration of mixed bed resin. However, the plant also may be used in connection with single bed resins with only minor modifications, as outlined during the following description.

While still in the inverted position, the service cylinders 38 are further flushed by the calcium-free water in line 40 to remove any last traces of resin from the cylinder. The spent flush water is removed by line 44 and is passed through a filter 46 to trap the residual resin before passing to drain by line 48.

The slurry of mixed bed resin in line 42 is passed to a mixed bed pretreatment and separation unit 50. This unit is illustrated, for ease of description and illustration of the operations effected therein, as comprising a pretreatment vessel 52 and a separation vessel 54. In practice, only a single vessel usually is used combining the operations of the two vessels.

The slurry entering the pretreatment vessel 52 is contacted by saturated brine solution fed by line 56 from a brine preparation tank 58. The brine preparation tank 58 may comprise two reservoirs and a recirculating pump. Process water, in the form of calcium-free water in line 60 (from line 26), is controlled in level in the first reservoir above the level of a screened platform on which solid sodium chloride, fed by line 62, is located. The brine so produced is forwarded by a mechanical pump to the second reservoir, a calibrated brine addition reservoir equipped with an adjustable overflow device to maintain the required amount of brine in the calibrated reservoir for the volume of resin to be separated as a batch.

The saturated brine solution is diluted with calcium-free water in line 64 by mixing in a vacuum aspirator or the like to avoid osmotic shock to the resin and, upon passing through the mixed bed of resin in the pretreatment vessel 52, ensures that the resin is completely exhausted. In this way, separation of the cationic and anionic resin in the separation vessel 54 is enhanced. The used solution is discharged to drain by line 66. Calcium-free water fed by line 64 (from line 269 then is passed through the bed to wash away the brine, the spent water passing to drain by line 66.

A sanitizing fluid next is passed into the pretreatment vessel 52 by line 68 in order to kill any microorganisms which may be present. Any convenient sanitizing fluid may be used, such as, an aqueous solution of the chlorine-liberating compound known by the trademark "HALANE". The spent sanitizing fluid is flushed from the bed by calcium-free water fed by line 64 to drain line 66.

The treated resin bed then is contacted with hydrochloric acid fed by line 70. The hydrochloric acid preferably is in the form of partially used hydrochloric acid from the cationic regeneration, described below, although fresh hydroactonic acid may be used on start-up, or at any other time, if desired. Since this form of hydrochloric acid is used, additional hydrochloric acid is not required and the acid values of the partially spent hydrochloric acid are utilized, rather than being discarded, as occurs in the prior art.

The purpose of the hydrochloric acid addition is to strip calcium salts fouling the anionic exchange resin and to strip certain organic contaminants from both the anion and cation exchange resin, otherwise such fouling would inhibit regeneration of the resins. The calcium fouling arises from the tendency for the first contacted resin to be exhausted first and the tendency of calcium salts, usually calcium hydroxide and calcium carbonate, to precipitate on the surface of that exhausted anion exchange resin.

Contact of the resin bed with the hydrochloric acid fed by line 70, therefore, removes the calcium contamination from the anion exchange resin along with organic contaminants from both resins and at the same time converts the resin to a chloride form. As will become apparent below, steps are subsequently taken to convert the chloride form of the resin to the usable hydroxyl form. The waste from the acid treatment is forwarded by line 72 to a neutralization vessel 74.

Following rinsing of the resin bed free from acid by calcium-free wash water fed by line 64 and passage of the spent wash water to the neutralization vessel 74 by line 72, the pretreated resin bed is subjected to hydraulic separation in separation vessel 54 in an upflow of calcium-free water fed by line 76 (from line 26) at a flow rate sufficient to expand the resin bed to permit the heavier cation exchange resin beads to settle while the lighter anion exchange resin beads migrate upwards. The hydraulic separation also effects substantial back-washing of the resin to remove particulates associated therewith, the effluent passing to drain by line 77. A slurry containing substantially only anion exchange resin beads is removed from the separation vessel 54 by line 78 and a slurry containing substantially only cation exchange resin beads is removed from the separation vessel 54 by line 80.

The slurries in lines 78 and 80 are forwarded to a regeneration unit 82 which includes an anion resin regeneration vessel 84 which receives the anion slurry in line 78 and a separate cationic regeneration vessel 86 which receives the cationic slurry in line 80. In the event that the cylinders 38 contain exhausted single bed resin, then the resin may be passed directly to its respective regeneration vessel without passage through the pretreatment and separation unit 50, or may be first subjected to the pretreatment operations described above. Generally, the exhausted resin from a plurality of portable cylinders is treated simultaneously in the regeneration unit 82.

The exhausted anion exchange resin in the regeneration vessel 84 is first contacted by an upward backwash flow of calcium-free water fed by line 88 (from line 26) to expand the resin bed, and to remove any residual resin fines and other particulate material, the waste from the backwash passing to drain by line 90. A similar backwash operation is effected on the cation exchange resin in the regeneration vessel 86, using calcium-free wash water fed by line 92 (from line 26) with the waste passing to drain by line 94. Drain lines 90, 94 and also 77 may be provided with traps to avoid the accidental loss of resin from the system by these lines.

Sodium hydroxide solution is added to the anionic regeneration vessel 84 by line 96 and passes downwardly through the bed of resin. This sodium hydroxide solution preferably is partially spent sodium hydroxide solution from the regeneration although fresh sodium hydroxide solution may be used on start up, or at any other convenient time. In this way, the valuable residual chemical content of the solution is at least partially reused, rather than being discarded to waste and requiring additional sodium hydroxide to be fed.

The addition of the sodium hydroxide solution causes the anion exchange resin to reconvert from the chloride form resulting from the hydrochloric acid treatment in the pretreatment vessel 52 to its hydroxyl form. The effluent is withdrawn by line 98 which extends downwardly within the vessel 84 to the bottom of the bed and then is forwarded by line 99 to neutralization vessel 74.

Thereafter, regenerant chemical, in the form of sodium hydroxide solution or any other suitable alkaline regenerant chemical, at an elevated temperature is fed by line 100 to the anionic regeneration vessel 84. The sodium hydroxide solution is formed in its diluted form by using a vacuum aspirator 102 to draw heated concentrated sodium hydroxide solution by line 104 from a calibrated transparent sodium hydroxide supply tank 106 containing the calibrated amount of chemical for the quantity of resin to be regenerated and heated deionized water by line 107 (from line 34) into admixture. The use of a transparent calibrated holding vessel for the chemical enables the operator to check for proper supply and usage.

The sodium hydroxide solution percolates downward through the bed of resin beads regenerating there. The greater specific gravity of the sodium hydroxide solution and the positive pressure imparted to the solution by the vacuum aspirator 102 causes the spent solution to be forced out through line 98. The spent sodium hydroxide solution passes from line 98 by line 108 into a storage tank 110 in a neutralization unit 112. The sodium hydroxide solution which was fed to the anionic regeneration vessel 84 by line 96 is drawn from storage tank 110.

The anionic regeneration vessel 84 generally is in the form of an upright cylinder and is provided with a sealed cover. This construction permits the introduction of the sodium hydroxide solution to enter at the uppermost level. Adequate contact between the regenerant solution and the resin bed results as the solution is passed down through the entire bed before reaching the exit pipe, which is equipped with a screen to prevent egress of the resin from the bed, and must overcome the hydrostatic of the height of the vessel to exit the tank. This procedure is more effective than counterflow operations and simple gravity-induced flow operations.

Following completion of the regeneration cycle, a slow rinse of regenerant chemical from the bed is effected by continued flow of heated deionized water through aspirator 102 and line 102 with the spent wash water passing to the neutralizing vessel by line 108. This continued flow also ensures that all the calibrated amount of chemical is utilized. Thereafter, a final fast rinse is effected using heated deionized water fed by line 114, on this occasion the spent water passing out of the base of the vessel by line 116.

Conductivity measurement probes are located in line 116 with circuitry appropriate to terminate the fast rinse at a pre-set conductivity point. A diverter valve 118 is located in line 116 so that the effluent rinse water may be diverted to a holding tank 120 rather than to drain by line 122 for pre-set water quality parameters.

The initial flow of fast rinse water effluent carries a higher concentration of regenerant chemical than the continuing flow. A substantial proportion of the effluent water is heated, deionized water with a relatively low level of contaminants and suitable for reuse. By diverting this effluent water to a holding tank, considerable efficiency, by way of water and energy saving can be effected. This is in contrast to the prior art where all of such wash water has been discarded.

The cationic regeneration vessel 86 is constructed identically to the anionic regeneration vessel 84 and the same sequency of regeneration, slow rinse and fast rinse is effected therein as is effected in the anionic regeneration vessel. Acid regenerant chemical, generally in the form of dilute hydrochloric acid is fed to the vessel 86 by line 124, and is formed by mixing of concentrated hydrochloric acid, fed from a calibrated transparent storage tank 126 containing the calibrated amount of hydrochloric acid to effect the regeneration by line 128 with deionized water fed by line 130 (from line 34) in a vacuum aspirator 132.

The spent hydrochloric acid is passed by line 144 from the base of the vessel 84 to a holding tank 146 in the neutralization unit 112. The hydrochloric acid which is used in the pretreatment vessel 52 is drawn from this holding tank 146.

Deionized water for the slow rinse is fed through aspirator 132 by line 124 and for the fast rinse is fed by line 134, the fast rinse effluent being removed by line 136. A diverter valve 138 diverts water for reuse to the holding tank 120 by line 140, while the remainder passes to drain line 142.

The utilization of the sealed regeneration vessels 84 and 86 is a considerable improvement over the prior art where open-topped vessels are used. The sealed vessels 84 and 86 do not permit vapour from regenerant chemicals, especially hydrochloric acid, to escape and cause corrosion to plant fixtures, structural steel, building hardware and electrical devices and provide unpleasant working and medically undesirable conditions. With the prior art open-topped vessels, the latter problems were commonplace.

The sealed vessels operating at a slight positive pressure exclude contaminants from the vessels and the hazzards associated with pumping concentrated chemicals into open-topped vessels filled with water. In addition, the use of the vacuum aspirator mixers 102 and 132 permits controlled dilution of the chemicals, in contrast to the prior art procedure, which simply permitted chemical to migrate through the water-filled vessel.

The regenerated anion exchange resin is flowed in slurry form from the base of the vessel 84 by line 148 to a cylinder recharge facility 150 while the regenerated cation exchange resin is flowed as a slurry from the base of the vessel 86 to the recharging facility 150 by line 152. The recharging facility contains a mixing tank 154 which receives the resin slurries and mixes them intimately. The regeneration vessels 84 and 86 usually have inspection windows, so that an operator may observe the rate of flow of each of the resin streams and adjust for the mixing ratio desired.

The mixed resin exits from the bottom of the mixing tank 154 and flows by gravity into a holding vessel 156. The holding vessel 156 is pressurized by deionized water fed thereto by line 158 (from line 34). An empty cylinder 160 is rapidly and consistently filled with a slurry of mixed bed resin under the controlled positive pressure in the vessel 156.

The latter filling operation contrasts with the prior art procedure which uses a head of water above the mixed bed resin to force a slurry into the empty cylinder, accompanied by vibration of the cylinder.

In the event that the cylinder is desired to contain only a single resin bed, then the cylinder may be filled directly from the slurry in line 148 or 152.

An important aspect of the plant 10 is the provision of waste neutralization unit 112. Untreated or inadequately treated effluent bearing regenerant chemicals is corrosive and can cause damage to sewer lines and adversely affect the function of sewage treatment plants. In addition to neutralizing part of the partially spent chemicals from the regenerations, as described in detail above, the remainder of the chemicals pass to the neutralization vessel 74 by lines 162 and 164 respectively. The neutralization vessel 74 also receives spent chemicals and spent wash water from the pretreatment vessel by line 72 and the anionic regeneration vessel by line 98.

A pH meter 166 is used to determine the resulting pH. In the event of the pH being other than neutral, a measured quantity of a suitable neutralizing chemical is fed to the neutralization vessel 74 by line 168, before discharging the essentially neutral, harmless effluent to drain by line 170.

A cleaning and sanitation system may be provided in association with the regeneration vessels 84 and 86 for use when required. The closed form of these vessels facilitates the use of a mechanical cleaning process. A high velocity pump may be used to circulate cleaning solution from a reservoir to the vessel to be cleaned. A return line may be provided to allow for recirculation of the cleaning solution over the time period required to allow contaminants adhering to the internal surfaces of the vessel to go into solution. When cleaning is complete, the regeneration vessel is drained and the cleaning solution rinsed from the vessel with calcium-free water.

The sanitizing cycle follows the same procedure, except that a sanitizing solution is used in place of the cleaning solution, with a rinse cycle being used after completion of sanitizing.

In the prior art, where the open-topped vessels are used, cleaning and sanitizing has been carried out using a variety of brushes and scrubbing techniques.

As will be apparent from the above description of plant 10, the plant may be operated manually or, more conveniently, automatically. Electronic process control can be provided to effect automatic operation which in turn minimizes the labour requirement, eliminates operator error, conserves heat energy, water, purified water and chemicals, protects sewer systems and minimizes their use through water conservation, minimizes resin loss, and allows unattended regeneration, freeing personnel for delivery, exchange and installation of service cylinders.

SUMMARY OF DISCLOSURE

In summary of this disclosure, the present invention provides a novel and improved ion exchange resin regeneration plant. Modifications are possible within the scope of this invention.

What I claim is:

1. A process for the regeneration of at least partially exhausted cation exchange material and at least partially exhausted anion exchange material, which comprises:

feeding at least partially exhausted cation exchange material to a first enclosed regeneration zone to form a bed thereof therein;

feeding at least partially exhausted anion exchange material to a second enclosed regeneration zone physically separate from said first enclosed regeneration zone to form a bed thereof therein;

forming a dilute aqueous solution of hydrochloric acid by mixing concentrated hydrochloric acid and substantially deionized water in a first mixing zone located externally of said first enclosed regeneration zone;

feeding said dilute aqueous hydrochloric acid into said first enclosed regeneration zone and flowing said dilute aqueous hydrochloric acid downwardly under a positive pressure and in contact with said bed of the cation exchange material contained in said first enclosed regeneration zone to a location at substantially the lower extremity of the bed of cation exchange material to effect regeneration of said at least partially exhausted cation exchange material;

flowing said dilute hydrochloric acid from said location at substantially the lower extremity of the bed upwardly through the bed of cation exchange material out of physical contact therewith to an outlet from the first regeneration zone above the upper extremity of the bed;

recovering regenerated cation exchange material from said first enclosed regeneration zone;

forming a dilute aqueous solution of sodium hydroxide by mixing concentrated sodium hydroxide solution and substantially deionized water in a second mixing zone physically separate from said first mixing zone and located externally of said second enclosed regeneration zone;

feeding said dilute aqueous solution of sodium hydroxide into said second enclosed regeneration zone and flowing said dilute aqueous sodium hydroxide solution downwardly under a positive pressure and in contact with said bed of anion exchange material contained in said second enclosed regeneration zone to a location at substantially the lower extremity of the bed of anion exchange material to effect regeneration of said at least partially exhausted anion exchange material;

flowing said dilute sodium hydroxide solution from said location at substantially the lower extremity of the bed upwardly through the bed of anion exchange material out of physical contact therewith to an outlet from the second regeneration zone above the upper extremity of the bed; and recovering regenerated anion exchange material from said second enclosed regeneration zone.

2. The process of claim 1 wherein said regeneration steps are effected substantially simultaneously.

3. The process of claim 1 wherein said at least partially exhausted cation exchange material and anion exchange material are obtained from a plurality of exhausted service demineralizers employing the mixed bed principle, in which each service unit is filled with a mixed bed of exhausted anion and cation exchange materials.

4. The process of claim 3 wherein said mixed bed of ion-exchange material is subjected to the steps of:

contacting the mixed bed with sodium chloride solution to ensure that said ion-exchange material is completely exhausted;

contacting the mixed bed with a sanitizing fluid to kill any microorganisms in said bed;

contacting the mixed bed with hydrochloric acid to effect stripping of calcium salts from anion exchange material and organic materials from anion and cation exchange material in said mixed bed and thereby to cause said anion exchange material to be in chloride form; and effecting substantially complete hydraulic separation of said anion exchange material from said cation exchange material while simultaneously effecting backwashing of said ion exchange material to remove particulates therefrom and wherein said hydraulically-separated ion-exchange materials are separately fed to their respective regeneration zones.

5. The process of claim 4 wherein each of said contact steps is followed by a washing step utilizing substantially calcium-free water to remove the chemical used in said contact step, and said hydraulic separation is effected using substantially calcium-free water.

6. The process of claim 4 or 5 wherein said hydrochloric acid used in said calcium and organic stripping step is constituted by partially spent hydrochloric acid from said cation exchange material regeneration.

7. The process of claim 1, 2 or 4 including:

in said first enclosed regeneration zone prior to said regeneration of said exhausted cation exchange material, subjecting said exhausted cation exchange material to backwashing to remove therefrom particulate matter contained therein; and in said second enclosed regeneration zone prior to said regeneration of said exhausted anion exchange material, subjecting said exhausted anion exchange material to backwashing to remove therefrom particulate matter contained therein.

8. The process of claim 7 wherein said backwashing in both said first and second enclosed regeneration zones is effected using substantially calcium-free water.

9. The process of claim 7 including, in said second enclosed regeneration zone following said backwashing and prior to said regeneration of said exhausted anion exchange material, contacting said exhausted anion exchange material in the chloride form with sodium hydroxide solution to convert said exhausted anion exchange material in chloride form to hydroxyl form.

10. The process of claim 9 wherein said sodium hydroxide solution used in said chloride conversion is constituted by partially spent sodium hydroxide solution from said anion exchange material regeneration.

11. The process of claim 10 wherein said hydrochloric acid used in said calcium and organic stripping step is constituted by partially spent hydrochloric acid from said cation exchange material regeneration.

12. The process of claim 11 including:

collecting partially spent aqueous hydrochloric acid solution from said cation exchange material regeneration; and collecting partially spent aqueous sodium hydroxide solution from said anion exchange material regeneration.

13. The process of claim 12, including:

forwarding partially spent aqueous hydrochloric acid solution used in said calcium and organic stripping step to a neutralization zone, forwarding partially spent aqueous sodium hydroxide solution used in said chloride conversion step to said neutralization zone, forwarding any partially spent aqueous hydrochloric acid solution not used in said calcium and organic stripping step to said neutralization zone;

forwarding any partially spent aqueous sodium hydroxide solution not used in said chloride conversion step to said neutralization zone;

monitoring the pH of the solution resulting in said neutralization zone from said forwarding steps, and adding neutralizing chemical as required to said resulting solution to effect substantial neutralization thereof for discharge.

14. The process of claim 3 including mixing said regenerated anion exchange material and said regenerated cation exchange material to form a mixed bed thereof in desired proportions, and charging said mixed bed to empty service units.

15. The process of claim 14 including passing said mixed bed into a pressure vessel, pressurizing said mixed bed in said pressure vessel using substantially deionized water, and effecting said charging of said empty service units by flowing a slurry of said mixed bed into said units under the pressure of said substantially deionized water.

16. The process of claim 1, 5, or 15 wherein said substantially calcium-free water and said substantially deionized water are formed by the steps of:

subjecting municipal water supply to filtration to remove particulates therefrom and activated carbon bed treatment to remove organic material and chlorine therefrom, subjecting part of the treated water resulting from said filtration and carbon bed treatment steps to contact with ion exchange material in the sodium form to remove calcium ions therefrom and form said substantially calcium-free water, and subjecting the remainder of said treated water to deionization to form said substantially deionized water.

17. The process of claim 17 wherein said remainder of said treated water is heated prior to said deionization.

18. The process of claim 1 wherein said regeneration of said cation exchange material and said regeneration of said anion exchange material are each followed by rinsing the respective material with substantially deionized water to remove regeneration chemical substantially completely therefrom.

19. A regeneration apparatus for the regeneration of at least partially exhausted cation exchange material and at least partially exhausted anion exchange material, which comprises:

a first upright enclosed regeneration vessel for effecting regeneration of exhausted cation exchange material therein;

a second upright cylindrical enclosed regeneration vessel for effecting regeneration of exhausted anion exchange material therein;

first vacuum aspirator means;

first conduit means connecting a first inlet to said first vacuum aspirator means to a concentrated acid regenerant chemical storage vessel and second conduit means connecting a second inlet to said first vacuum aspirator means to a source of deionized water;

third conduit means connecting an outlet from said first vacuum aspirator means to an inlet to said first regeneration vessel located in a top closure thereof for feeding dilute acid regenerant chemical formed by mixing said concentrated acid regenerant chemical and deionized water therein from said first vacuum aspirator means to said first regeneration vessel to effect regeneration of exhausted cation exchange material therein by flowing said dilute acid regenerant chemical downwardly through and in contact with a bed of cation exchange material supported in said first regeneration vessel;

said first regeneration vessel including conduit means extending downwardly from an outlet in said top closure to a location adjacent the bottom thereof to receive and convey therein spent acid regenerant chemical to said outlet and screen means located at said location adjacent the bottom of the vessel for supporting said bed of cation exchange material in said first regeneration vessel for contact with acid regenerant chemical;

said first regeneration vessel further including second inlet means located in a lower closure of the regeneration vessel below said screen means and connected to a source of calcium-free water to enable said calcium-free water to flow into the first regeneration vessel, though the screen means and through and in contact with said bed of cation exchange material to a second outlet located adjacent said top closure to effect backwashing of the exhausted cation exchange material to remove particulates therefrom prior to contact with the acid regenerant solution;

said first regeneration vessel further including a third inlet located above said screen means and above the intended height of the cation exchange material in the bed for feeding a slurry of exhausted cation exchange material to the first regeneration vessel, a fourth inlet located in said top closure connected to a source of deionized water for feeding deionized water to said first regeneration vessel to effect washing of regenerated cation exchange material free of acidic regenerant chemical, a third outlet located in the lower closure for discharge of spent deionized water from the first regeneration vessel and a fourth outlet located adjacent the lower closure for discharge of regenerated cation exchange material from the first regeneration vessel as a slurry in the deionized water;

second vacuum aspirator means;

fourth conduit means connecting a first inlet to said second vacuum aspirator means to a concentrated alkaline regenerant chemical storage vessel and fifth conduit means connecting a second inlet to said second vacuum aspirator means to a source of deionized water; and sixth conduit means connecting an outlet from said second vacuum aspirator means to an inlet to said second regeneration vessel located in a top closure thereof for feeding dilute alkaline regenerant chemical solution formed by mixing said concentrated alkaline regenerant solution and deionized water therein from said second vacuum aspirator means to said second regeneration vessel to effect regeneration of exhausted anions exchange material therein by flowing said dilute alkaline regenerant chemical solution downwardly through and in contact with a bed of anion exchange material supported in said second regeneration vessel;

said second regeneration vessel including conduit means extending downwardly from an outlet in said top closure to a location adjacent the bottom thereof to receive and convey therein spent alkaline regenerant chemical to said outlet and screen means located at said location adjacent the bottom of the vessel for supporting said bed of anion exchange material in said second regeneration vessel for contact with said alkaline regenerant chemical;

said second regeneration vessel further including second inlet means located in a lower closure of the regeneration vessel below said screen means and connected to a source of calcium-free water to enable said calcium-free water to flow into the second regeneration vessel, through the screen means and through and in contact with said bed of anion exchange material to a second outlet adjacent said top closure to effect backwashing of the exhausted anion exchange material to remove particulates therefrom prior to contact with the alkaline regenerant solution;

said second regeneration vessel further including a third inlet located above said screen means and above the intended height of the anion exchange material in the bed for feeding a slurry of exhausted cation exchange material to the second regeneration vessel, a fourth inlet located in said top closure connected to a source of deionized water for feeding deionized water to said second regeneration vessel to effect washing of regenerated anion exchange material free of alkaline regenerant, a third outlet located in the lower closure for discharge of spent deionized water from the second regeneration vessel and a fourth outlet located adjacent the lower closure for discharge of regenerated anion exchange material from the second regeneration vessel as a slurry in deionized water.

20. A process for the regeneration of at least partially exhausted cation exchange material and at least partially exhausted anion exchange material obtained from a plurality of exhausted service demineralizers employing the mixed bed principle in which each service unit is filled with a bed of exhausted anion and cation exchange materials, which comprises:

contacting the mixed bed with sodium chloride solution to ensure that said ion-exchange material is completely exhausted;

contacting the mixed bed with a sanitizing fluid to kill any microorganisms in said bed;

contacting the mixed bed with hydrochloric acid to effect stripping of calcium salts from anion exchange material and organic materials from anion and cation exchange material in said mixed bed and thereby to cause said anion exchange material to be in chloride form;

effecting substantially complete hydraulic separation of said anion exchange material from said cation exchange material while simultaneously effecting backwashing of said ion exchange material to remove particulates therefrom, separately feeding the hydraulically-separated at least partially exhausted cation exchange material to a first enclosed regeneration zone and the hydraulically-separated at least partially exhausted anion exchange material to a second enclosed regeneration zone physically separate from said first enclosed regeneration zone, subjecting said exhausted cation exchange material to backwashing in said first enclosed regeneration zone to remove particulate matter therefrom, subjecting said exhausted anion exchange material to backwashing in said second enclosed regeneration zone to remove particulate matter therefrom and contacting said exhausted anion exchange material in the chloride form with sodium hydroxide solution to convert said exhausted anion exchange material in chloride form to hydroxyl form, forming a dilute aqueous hydrochloric acid solution by mixing concentrated hydrochloric acid and substantially deionized water in a first mixing zone located externally of said first enclosed regeneration zone;

feeding said dilute aqueous hydrochloric acid into said first enclosed regeneration zone to effect regeneration of said at least partially exhausted cation exchange material;

recovering regenerated cation exchange material from said first enclosed regeneration zone;

collecting partially spent aqueous hydrochloric acid solution from said first enclosed regeneration zone, passing at least part of said collected spent hydrochloric acid to said calcium and organic stripping step as the hydrochloric acid utilized therein, and forwarding the hydrochloric acid so used and any collected hydrochloric acid not so used to a neutralization zone;

forming a dilute aqueous sodium hydroxide solution by mixing concentrated sodium hydroxide solution and substantially deionized water in a second mixing zone and located externally of said second enclosed regeneration zone;

feeding said dilute sodium hydroxide solution into said second enclosed regeneration zone to effect regeneration of said at least partially exhausted anion exchange material to effect regeneration of said at least partially exhausted anion exchange material;

recovering regenerated anion exchange material from said second enclosed regeneration zone;

collecting partially spent aqueous sodium hyroxide solution from said anion exchange material regeneration, passing at least part of said collected spent sodium hydroxide to effect said chloride conversion step, and forwarding the sodium hydroxide solution so used and any collected sodium hydroxide solution not so used to said neutralization zone, monitoring the pH of the solution resulting in said neutralization zone from said forwarding steps, and adding neutralizing chemical as required to said resulting solution to effect substantial neutralization thereof for discharge.

* * * * *